United States Patent
Kirsch et al.

(10) Patent No.: US 7,962,762 B2
(45) Date of Patent: Jun. 14, 2011

(54) STORING AND ACCESSING DATA IN A MOBILE DEVICE AND A USER MODULE

(75) Inventors: Jochen Kirsch, Munich (DE); Ralf Klaassen, Munich (DE); Stefan Eckardt, Munich (DE)

(73) Assignee: Giesecke & Devrient GmbH, München (DE)

( * ) Notice: Subject to any disclaimer, the term of this patent is extended or adjusted under 35 U.S.C. 154(b) by 1280 days.

(21) Appl. No.: 10/497,200

(22) PCT Filed: Dec. 2, 2002

(86) PCT No.: PCT/EP02/13627
§ 371 (c)(1),
(2), (4) Date: Jan. 26, 2005

(87) PCT Pub. No.: WO03/049471
PCT Pub. Date: Jun. 12, 2003

(65) Prior Publication Data
US 2005/0120225 A1 Jun. 2, 2005

(30) Foreign Application Priority Data
Dec. 4, 2001 (DE) .................................. 101 59 398

(51) Int. Cl.
*G06F 12/14* (2006.01)
(52) U.S. Cl. ...................................................... 713/193
(58) Field of Classification Search .................. None
See application file for complete search history.

(56) References Cited

U.S. PATENT DOCUMENTS

| 5,633,484 A | 5/1997 | Zancho et al. |
| 5,802,175 A | 9/1998 | Kara |
| 5,814,798 A | 9/1998 | Zancho |
| 7,010,809 B2 * | 3/2006 | Hori et al. ........................ 726/26 |
| 7,272,723 B1 * | 9/2007 | Abbott et al. ................. 713/185 |

FOREIGN PATENT DOCUMENTS

| CA | 2292530 A1 | 6/2000 |
| CN | 1132874 | 10/1996 |

(Continued)

OTHER PUBLICATIONS

"The Zimmerman Telegram", http://web.archive.org/web/19990429162731/http://www.users.globalnet.co.uk/~firstcut/Ztelegram.html; vol. 2, issue 1; Dec. 4, 1998; 9 pages.

(Continued)

*Primary Examiner* — Brandon S Hoffman
(74) *Attorney, Agent, or Firm* — Rothwell, Figg, Ernst & Manbeck, P.C.

(57) ABSTRACT

The invention relates to methods for storing and accessing user data (48) and configuration data (62) in a mobile device (10) that is connected to a user module (12). According to a first aspect of the invention, the user data (48) is stored in the mobile device (10) at least partially in encrypted form, and is decrypted, in access operations, using a decrypting function (66) of the user module (12). According to a second aspect of the invention, the configuration data (62) is stored in the user module (12). The configuration data (62) indicates whether, or to what extent, an application program (46) is allowed to be executed by the mobile device (10). Security and protection against unauthorised access to user data (48) and application programs (46) in the mobile device (10) are increased by the invention.

17 Claims, 1 Drawing Sheet

FOREIGN PATENT DOCUMENTS

| | | |
|---|---|---|
| DE | 197 41 330 A1 | 7/1998 |
| DE | 197 24 901 A1 | 12/1998 |
| DE | 100 17 414 A1 | 6/2001 |
| EP | 0 730 387 A2 | 9/1996 |
| EP | 0 891 111 A2 | 1/1999 |
| EP | 0 969 644 A | 1/2000 |
| EP | 1 107 627 A1 | 6/2001 |
| EP | 1107627 A1 * | 6/2001 |
| EP | 1 221 691 A1 | 7/2002 |
| JP | 11306112 A | 11/1999 |
| JP | 2000194665 A | 7/2000 |
| JP | 2001-016325 | 1/2001 |
| JP | 2002-544610 A | 12/2002 |
| WO | WO 91/12698 A1 | 8/1991 |
| WO | 00/39987 A1 | 7/2000 |
| WO | WO 00/48416 A1 | 8/2000 |
| WO | WO 00/59244 A1 | 10/2000 |
| WO | 00/69183 A2 | 11/2000 |

OTHER PUBLICATIONS

Japanese Office Action issued in corresponding Japanese patent application No. 2008-106580 on Mar. 29, 2011 along with English translation, 9 pages.

* cited by examiner

STORING AND ACCESSING DATA IN A MOBILE DEVICE AND A USER MODULE

CROSS REFERENCE TO RELATED APPLICATIONS

This application is a National Stage of International Application No. PCT/EP02/13627, filed Dec. 2, 2002.

FIELD OF THE INVENTION

The invention relates generally to the technical field of storing and accessing data in mobile devices, as well as in user modules for devices of this type. Mobile devices that provide the user with both telecommunications functions (for example, the transfer of speech and/or data via a telecommunications network) and application programs (for example, an appointment scheduler or a text editor) are a preferred area of application of the invention. Mobile devices of this type may, in particular, be configured as powerful mobile telephones or as PDAs (personal digital assistants).

BACKGROUND OF THE INVENTION

German laid-open application DE 197 24 901 A1 discloses a mobile telephone to the GSM standard (GSM=global system for mobile communication). The mobile telephone comprises a control unit, a device memory and an interface for a subscriber identity module (SIM). User data, such as address lists, turnover data or price lists, for example, may be loaded into the device memory via a line connection to a computer. It is also possible to load programs (not described in greater detail) into the device memory via the line connection, and subsequently to execute them through the mobile telephone. Data may be transferred in an integrity-assured or encrypted form.

When GSM mobile telephones are switched on, there is generally an authorisation check, wherein the user has to enter a personal secret number (PIN=personal identification number). The full user interface, including the option to access the user data stored in the mobile telephone, is only enabled if the secret number is entered correctly. Most confidential user data is therefore secure to a certain degree. There is, however, the problem that sufficiently devoted criminals are able to get round this security. Memory components of mobile telephones may, for example, be read out directly at hardware level using appropriate devices.

It is particularly beneficial to store user data in a mobile device if the mobile device is also set up to execute application programs for processing this user data. Powerful GSM mobile telephones and PDAs nowadays have this functionality. Because of the high transfer speeds of mobile devices of the 2.5th and 3rd generations, such as, for example, devices for the GPRS (general packet radio service), EDGE, UMTS (universal mobile telecommunications system) and WCDMA (wideband code-division multiple access) networks, application programs may be loaded and/or updated from a service provider into the mobile device via the air interface.

Said mobile devices are beset with problems and require improvement in numerous respects. In the first place, it should be possible to prevent unauthorised access to application programs. It should therefore be ensured that only the authorised user may call an application program, or individual secured functions of the application program. Secondly, it would be desirable to be able to offer the user a selection of functions that was tailored as closely as possible to his requirements. Thirdly, the provided functions should be as device-independent as possible.

SUMMARY OF THE INVENTION

An object of the invention is to solve said problems, completely or in part. A further object of the invention is to increase, in particular, security and protection against unauthorised access to user data and application programs in a mobile device. Yet a further object in preferred configurations of the invention is to provide a high degree of user convenience. Yet a further object in preferred configurations of the invention is that the invention is capable of being implemented cost-effectively.

According to a first aspect of the invention, the above objects are achieved, completely or in part, by a method for storing and accessing user data in a mobile device, the mobile device comprising a device memory and being connected to a user module via an interface, wherein the user data is stored in the device memory of the mobile device at least partially in encrypted form, and at least the decryption of the user data in access operations is performed using a decrypting function, which is provided by the user module and which is executed, at least in part, by a processor unit of the user module.

Further according to the first aspect of the invention, the above objects are achieved, completely or in part, by a mobile device comprising a device memory and an interface for connecting a user module, the device memory comprising at least one region for storing user data in at least partially encrypted form, wherein the mobile device is set up to use a decrypting function at least for decrypting the user data in access operations, the decrypting function being provided by the user module and being executed, at least in part, by a processor unit of the user module.

Further according to the first aspect of the invention, the above objects are achieved, completely or in part, by a user module comprising a processor unit and being set up to be connected to a mobile device via an interface, the mobile device comprising a device memory having at least one region for storing user data in at least partially encrypted form, wherein the user module is set up to provide the mobile device via the interface with a decrypting function at least for decrypting the user data in access operations, the decrypting function being executed, at least in part, by the processor unit of the mobile device.

According to a second aspect of the invention, the above objects are achieved, completely or in part, by a method for storing and accessing configuration data and for executing at least one application program in a mobile device, the mobile device comprising a device memory for the application program and being connected, via an interface, to a user module comprising a module memory, wherein the configuration data concerns at least the availability of the application program, or of individual functions thereof, and the configuration data is stored in the module memory and is read out therefrom, in order to determine whether, or to what extent, the application program will be executed.

Further according to the second aspect of the invention, the above objects are achieved, completely or in part, by a mobile device comprising a device memory for an application program and being connected, via an interface, to a user module comprising a module memory, wherein configuration data, which concern at least the availability of the application program, or of individual functions thereof, may be read out from the module memory via the interface, and wherein the mobile device is set up to determine, depending on the configuration data read out from the module memory, whether, or to what extent, the application program will be executed.

Further according to the second aspect of the invention, the above objects are achieved, completely or in part, by a user module comprising a module memory and being set up to be connected via an interface to a mobile device, the mobile device comprising a device memory for an application program, wherein the user module is set up to store configuration data in the module memory, the configuration data concerning at least the availability of the application program, or of individual functions thereof, and wherein the user module is set up to allow the mobile device to read out the configuration data via the interface in order to determine whether, or to what extent, the application program will be executed.

The invention starts from the basic idea of meeting the above-mentioned security requirements by storing user data and configuration data, respectively, in a suitable manner.

The first aspect of the invention relates to storing user data. Said data is stored, according to the invention, in encrypted form in the device memory of the mobile device. Corresponding functions, which are provided by the user module, are used at least to decrypt (and, in preferred configurations, also to encrypt) the user data.

Because all of the user data in the memory of the mobile device is in encrypted form only, said data is protected from prying eyes even if an unauthorised user bypasses the normal user interface of the mobile device to access the content of the device memory. The device memory, which is generally quite large, may be used to store user data without concerns for security, whereby relatively large amounts of data and complex data structures may be carried in the mobile device.

The user data to be stored according to the invention may be any data that the user desires. Preferably, it is data that may also be processed by an application program that runs on the mobile device, such as, for example, appointment and address lists for processing by an appointment scheduler having an address book function, business tables for processing, for example, by spreadsheet programs, speech data generated, for example, by dictation recording programs, or general texts for processing by text editors. It may also be desirable to store user data for which there is no appropriate application program available in the mobile device. In this case, the mobile device acts as a secure data carrier for exchanging user data between the workplace and a home office, for example.

In preferred configurations, the encrypting and decrypting functions are executed, completely or in part, by a processor unit of the user module, wherein the processor unit accesses key data that is contained in a module memory. The key data does not need to leave the user module in these configurations, allowing a particularly high degree of security to be obtained. This is the case, in particular, if the key data is also generated within the user module and written into the module memory. There are, however, also configurations of the invention wherein at least the encrypting, and optionally also the decrypting, of the user data is/are executed, completely or in part, by a processor unit of the mobile device, to which the encrypting and/or decrypting functions provided by the user module are transferred.

Preferably, an asymmetrical encrypting method, such as, for example, the RSA (Rivest-Shamir-Adleman) method is used. In this case, the key data comprises a public key and a private key. There are, however, also configurations wherein symmetrical encryption methods are used. In conceptual terms, reference is made to "encrypting and decrypting functions" in these configurations also, even though the same calculation steps are executed in both cases.

According to the invention, the user module is required at least for executing the decrypting steps. This in itself provides a certain degree of protection, as the user module and the mobile device may be kept separate. In preferred embodiments, it is, however, provided that at least the decrypting function is not enabled until a password (passphrase) has been entered and/or a biometric test, such as, for example, verification of a finger print or speech analysis, has been carried out. Through this measure, data security is ensured even if both the mobile device and the user module are mislaid.

The second aspect of the invention relates to the use of configuration data when executing an application program in the mobile device. This aspect is based on the basic idea of indicating, by means of the configuration data, the availability of the entire application program, or of individual functions of the application program. The configuration data is stored in the user module, while the application program is contained in the mobile device. The application program is executed only if, or to the extent that, it is indicated by the configuration data.

The teaching according to the invention offers protection against unauthorised execution of the application program or of individual program functions, because, in addition to the mobile device, the user module, with the corresponding configuration data allowing the program to be executed, is also always required. The invention also creates the technical basis for providing a program configuration that is tailored precisely to the requirements of the user. This is important, in particular, if there is a fee, which is dependent on the functionality provided, to be paid for using the program, as is the case, for example, with ASP schemes (ASP=application service providing). As the configuration data is stored, according to the invention, in the user module, the user may set up the configuration that he desires in any compatible mobile device, simply by plugging in the user module.

The term "application program", as it is used here, refers, in particular, to programs that execute data processing functions with regard to the above-mentioned user data. If the mobile device is a device with telecommunication functions, the application programs are preferably independent of these telecommunication functions, or may at least also be used for other purposes. Examples of typical application programs include appointment schedulers, address books, text editors, spreadsheet programs, databases, dictation recording programs, etc. The term "application programs", as it is used here, also includes programs that only provide user interfaces for the above-mentioned or similar applications (while the actual data processing is executed through the server of an ASP provider). In some configurations, browsers and viewers are also provided for displaying documents, in a formatted manner, as application programs. Application programs may, however, also be playback programs for multimedia content—in MP3 format, for example.

In order to further increase protection against unauthorised execution of the application programs, the read-out of the configuration data is preferably protected by a password and/or a biometric test, such as a voice or fingerprint analysis, for example. In this case, the user module only releases the configuration data, and thus allows the corresponding application program or the corresponding program function to be executed, if the user has provided sufficient evidence of his identity through the password and/or his biometric data.

The functionality according to the invention may also be used with mobile devices that contain one or more fixedly stored application programs. The configuration data is, however, preferably also used to control the loading of application programs, or at least of parts thereof, into the mobile device.

In mobile devices that comprise powerful functions for wireless data transfer, in particular, the application programs or the required program modules may be loaded from an external service provider via the air interface. This option is particularly advantageous in conjunction with ASP schemes. It is considerably more convenient for the user if he may initiate automatic loading of the required application programs corresponding to his configuration, simply by using the user module on any compatible mobile device. Non-proprietary loading of application programs is supported by using programming languages that operate independently of the computer platform, as is the case, for example, with Java®.

A combination of said two aspects of the invention is particularly advantageous, as this provides protection against unauthorised access to user data and protection against unauthorised execution of application programs.

In preferred configurations of the above-mentioned two aspects, the mobile device is a telecommunications device, in particular a mobile telephone or a personal digital assistant (PDA) having telephone functions. The user module is preferably a subscriber identity module (SIM), as is required for logging into a telecommunications network. A user module may, in particular, be provided that is protected from manipulation as a so-called trusted device or tamper-resistant device, so that encrypting and decrypting functions, or encrypted data, or confidential configuration data is/are protected from prying eyes. A subscriber identity module may be used even if the mobile device does not have any telephone functions or the module is not registered with a telephone provider, as modules of this type are produced in large numbers and may therefore be obtained relatively cheaply.

The mobile device and the user module are preferably further developed with features that correspond to the above-described features and/or further features.

BRIEF DESCRIPTION OF THE DRAWINGS

Further features, advantages and objects of the invention will emerge from the following detailed description of an embodiment of the invention and of a plurality of alternative configurations. Reference will be made to the drawing, in which.

DETAILED DESCRIPTION OF EMBODIMENTS OF THE INVENTION

Figure 1:
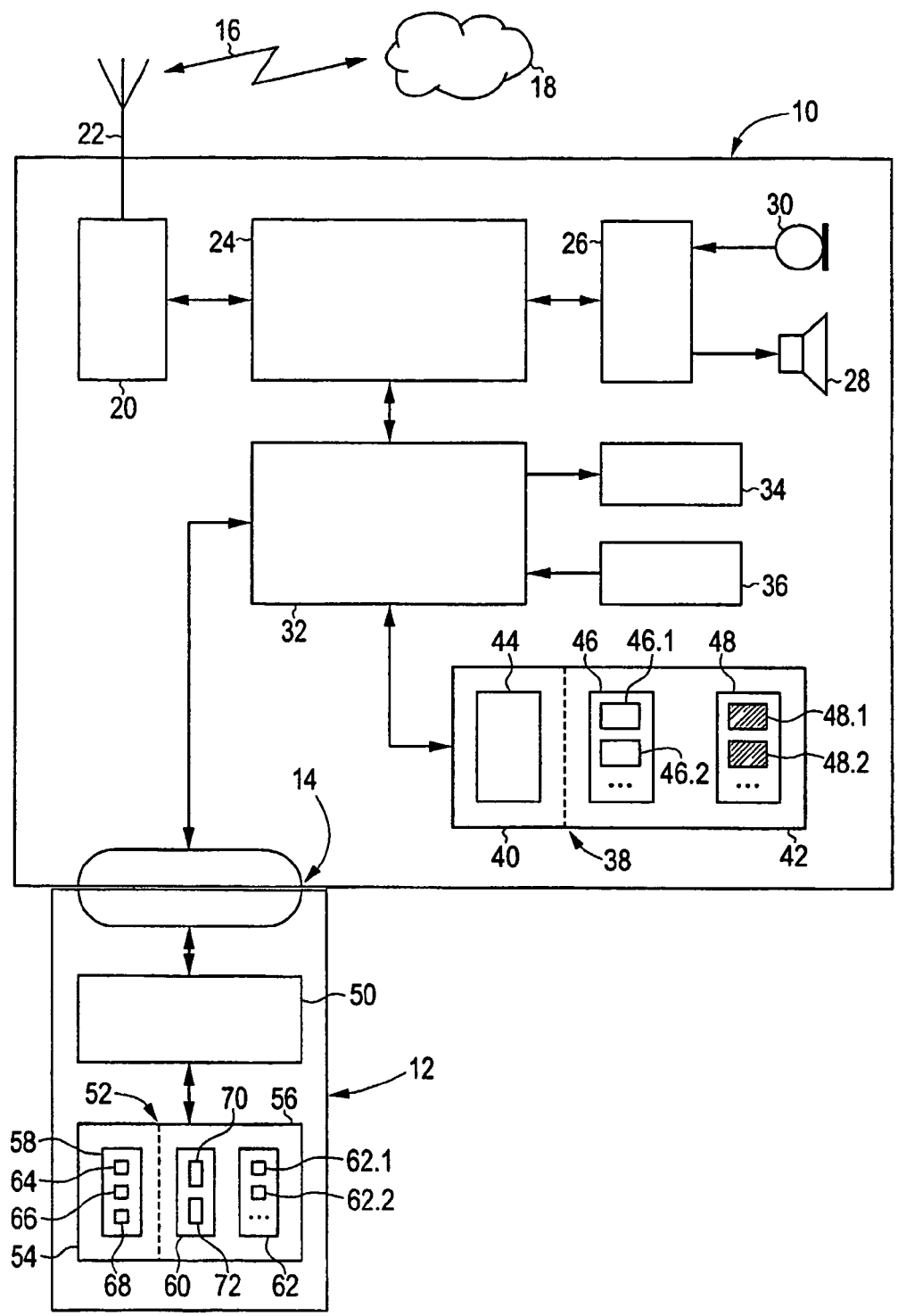
FIG. 1 shows a block diagram of essential functional units of a system according to the embodiment of the invention that is described herein.

FIG. 1 shows a mobile device 10 and a user module 12, which are connected to each other via an interface 14. In the present embodiment, the mobile device 10 is configured as a powerful mobile telephone, which provides telecommunication functions to the GSM standard for telephone services and the GPRS standard for data transfer services. The user module 12 is accordingly configured as a SIM card, which is inserted into the mobile telephone or arranged fixedly in the mobile telephone. The mobile device 10 is able to access a corresponding telecommunications network 18 via an air interface 16. In alternative configurations, the mobile device 10 is configured according to an enhanced mobile telephony standard, such as UMTS, and/or as a personal digital assistant (PDA), which may also be multimedia-capable.

In a manner known per se, the mobile device 10 comprises a high-frequency component 20, which sends and receives radio waves via an antenna 22. A digital signal processor (DSP) 24 is used to process the transmitted or received signal. The digital signal processor 24 also processes low-frequency signals, which are directed to a loudspeaker 28 via a low-frequency component 26, or are sent from a microphone 30, via the low-frequency component 26, to the digital signal processor 24. A processor unit 32 coordinates all of the operations taking place in the mobile device 10. The processor unit 32 is connected to the interface 14, the digital signal processor 24, a display 34, configured here as a graphic-capable LCD display, a keyboard 36 and a device memory 38. The device memory 38 may be configured in a fixedly installed or removable manner—in the form of a memory card, for example.

The device memory 38 is implemented by means of a plurality of semiconductor chips in various memory technologies. In the conceptual representation of FIG. 1, the device memory 38 comprises a read-only region 40 (implemented, for example, as a mask-programmed ROM) and a writable region 42, implemented, for example, as a RAM or EEPROM or FLASH memory. The read-only region 40 of the device memory 38 contains, in particular, operating programs 44, which are executed by the processor unit 32 as the basic operating system of the mobile device 10, as well as for implementing telecommunication functions. Application programs 46 and user data 48 are loaded into the writable region 42.

FIG. 1 shows, as an example of the application programs 46, an appointment scheduler 46.1 (having an address book function) and a text editor 46.2. An appointment and address list 48.1 for the appointment scheduler 46.1 and a letter 48.2 for the text editor 46.2 are shown as user data 48 in FIG. 1. The application programs 46 are executed by the processor unit 32 and access the user data 48. The user data 48 is stored in encrypted form in the device memory 38, as indicated by hatching in FIG. 1.

The user module 12 is configured as an SIM (subscriber identity module) for the telecommunications network 18, and the interface 14 also corresponds mechanically and electrically to the standards provided for this telecommunications network 18. The user module 12 comprises a processor unit 50, which is configured as a microcontroller and is integrated with a module memory 52 on a single chip. The module memory 52 is sub-divided, by various memory technologies, into a read-only region 54 and a writable region 56.

The module memory 52 contains control programs and data, which, firstly, provide basic operating system functions for the user module 12 and, secondly, allow the log-in and the telecommunications operation of the mobile device 10 with regard to the telecommunications network 18. For the sake of clarity, these control programs and data are not shown separately in FIG. 1. Cryptographic functions 58 in the read-only region 54 of the module memory 52, and key data 60 and configuration data 62 in the writable region 56, are particularly relevant for the aspects according to the invention of the embodiment described here, and are therefore shown in FIG. 1.

The cryptographic functions 58 include an encrypting function 64, a decrypting function 66 and a key generating function 68. The key data 60 is divided into a public key 70 and a private key 72. The configuration data 62 comprises a corresponding configuration data record for each application program 46 provided in the mobile device 10, i.e. in the embodiment described here, a configuration data record 62.1 for the appointment scheduler 46.1 and a configuration data record 62.2 for the text editor 46.2.

In operation, the system shown in FIG. 1 provides the conventional telecommunication functions corresponding to the respective standards, in the present case GSM and GPRS.

In addition, the user may start the application programs 46, and process the user data 48 or other data therewith.

In order to provide the application programs 46, the mobile device 10 accesses the configuration data 62 in the user module 12 when the mobile device 10 is switched on or, at the latest, when the user wishes to start an application program 46. This access takes place via the processor unit 50 of the user module 12, which, in turn, requires that a password is entered before it allows the access. The password request is displayed on the display 34 of the mobile device 10, and the user enters the corresponding password via the keyboard 36. The processor unit 50 checks that the password entered is the correct one.

If the user has entered the correct password, the user module 12 transfers the requested configuration data 62 (either all of the configuration data 62 or only the data record 62.1, 62.2 provided for the respective application program 46.1, 46.2) to the mobile device 10. The processor unit 32 then checks whether, according to the transferred configuration data 62, 62.1, 62.2, it is permissible to execute application programs 46 or the specifically requested application program 46.1, 46.2. If so, the program execution is allowed.

If the desired application program 46.1, 46.2 is already located in the device memory 38, the program may be started immediately. Otherwise, the required program or user data, for which a fee may be charged, is loaded into the device memory 38 via the air interface 16 and the telecommunications network 18 from a server of an ASP provider. This download process also has to be authorised by the user module 12, which acts as a so-called gatekeeper. Even if the desired application program 46.1, 46.2 is already contained in the device memory 38, a request may nevertheless be placed with the ASP service provider, via the air interface 16, firstly to transfer billing data and secondly to import any program updates, which may be available, into the mobile device 10.

In the embodiment described here, the configuration data 62 concerns not only the basic user authorisations, but also preferred settings of the application programs 46, such as, for example, preset file paths, language settings, menu configurations and other user preferences. These settings are made accessible to the started application program 46, so that the user always works with the program configuration that he desires. This is true even if the user connects his user module 12 to a new or different mobile device 10.

If application programming interfaces (APIs) become sufficiently standardised, as is expected in the medium term using the programming language Java®, for example, ASP providers will be able to offer application program services that are individually tailored to each user and are independent of the mobile device 10 used. A high level of security will also be obtained, as all of the application programs 46 may only be called if the user module 12 is present and the password has been entered. In order to prevent the mobile device 10 from being misused, in the event of it being stolen when switched on (after the user has entered the password), it may be provided that, after the user has been inactive for a predetermined length of time, it is requested that the password is re-entered, as is already known per se with screen savers for office computers that are not in use, for example.

In the embodiment described hitherto, an application program 46 was considered as the smallest unit for the authorisation mechanism and optionally the loading process via the air interface 16. Depending on the programming technology employed, a finer level of granularity may, however, also be used. The configuration data 62 may thus relate to the authorisation of the user to execute individual program functions or individual program modules, for example, and these program functions or program modules may, if required, be loaded individually via the air interface 16. This approach allows, firstly, long loading times to be avoided and, secondly, even more precise tailoring to user preferences. Also, in updating application programs 46 via the air interface 16, preferably only program modules that have actually changed relative to the version already in the mobile device 10 are transferred.

The user data 48 processed by the application programs 46 are stored in the device memory 38, either completely or at least partially in encrypted form. The user may, for example, be provided with a file system for storing user data 48, wherein individual folders or individual drives are selectively set for encrypted or unencrypted data storage. A similar functionality for stationary office computers, which does not employ a user module, is already known from the product PGPdisk®, from the manufacturer Network Associates, Inc.

If an application program 46 were to store user data 48 in a region of the file system provided for encryption, this data is transferred from the processor unit 32 via the interface 14 to the user module 12. The processor unit 50 of the user module 12 executes the encrypting function 64, wherein the public key 70 contained in the key data 60 is used. The encrypted user data 48 is written into the device memory 38 via the interface 14 and the processor unit 32.

User data 48 that has been stored in an encrypted form is accessed in a corresponding manner. Here too, the processor unit 50 of the user module 12 performs the actual decryption using the decrypting function 66 and the private key 72. Before this, however, the processor unit 50 requests that the user enters a passphrase. Only if the correct passphrase is entered on the keyboard 36 (or the user is correctly biometrically identified in another manner), is the decrypting process enabled.

In the embodiment described here, encryption and decryption are carried out according to an asymmetrical RSA method. In alternative configurations, in contrast, other asymmetrical or symmetrical encryption and decryption methods, or hybrid forms thereof, such as symmetrical encryption using an asymmetrically encrypted key, are provided. In symmetrical methods, there is no need to distinguish between the public key 70 and the private key 72.

In summary, the proposed technology ensures that the encrypted user data 48 may only be read out or used if the user module 12 of the authorised user is connected to the interface 14, and the user has correctly identified himself—by using the passphrase, for example.

In the present embodiment, the entire encryption and decryption procedure is carried out by the processor unit 50 of the user module 12, the key data 60 never leaving the user module 12. There are, however, alternative configurations, wherein the encrypting function 64 and the public key 70, which does not need to be kept secret, are transferred to the mobile device 10, so that the encryption process may be carried out by the, generally more powerful, processor unit 32 of the mobile device 10. In some alternative configurations, the processor unit 32 may also be used for the decryption process, provided that the security of the private key 72 is not thereby compromised.

In the present embodiment, the key generating function 68, which is also executed by the processor unit 50 of the user module 12, is used to generate the key data 60. In a manner known per se, this program calculates a pair of public key 70 and private key 72. This measure ensures a particularly high degree of data security, as the private key 72 does not leave the user module 12 even when the key is being generated.

The embodiment described here is limited neither to a single encrypted region for the user data 48, nor to a single encryption method. Assuming that appropriate proof of identity has been furnished, by means of the passphrase, an encrypted region may, for example, be deactivated at any time, and thus rendered freely accessible. The region may also be encrypted again with the same or a different user module 12. A plurality of encrypted regions, optionally with different key pairs and/or of different sizes, may also be established and managed.

In the present configuration, in particular, which provides an ASP provider, the encrypted user data 48 may, in addition to being stored in the mobile device 10, also be transferred via the air interface 16 to a server of the ASP provider, and be stored there. The user data 48 that is stored on both sides may be synchronised each time an application program 46 performs a write access, or if a user session is ended, or if explicitly requested by the user. The user then has, on the one hand, rapid access to the locally stored user data 48 and is, on the other hand, independent of the mobile device 10 used, as he may also retrieve the user data 48 that is stored with the ASP provider using any other mobile device.

In some configurations, it may also be provided to leave a component of the key with the network operator or the ASP provider. After the mobile device 10 has been successfully logged into the telecommunications network 18, this component of the key is transferred via the air interface 16, so that the network operator or ASP provider shares control of certain user data 48 stored in the mobile device 10 with the user.

The invention claimed is:

1. Method for storing and accessing user data in a mobile device, the mobile device comprising a device memory and being connected to a user module via an interface, said method comprising steps of:
   storing the user data in the device memory of the mobile device at least partially in encrypted form; and
   performing at least the decryption of the user data in access operations using a decrypting function provided by the user module and which is executed, at least in part, by a processor unit of the user module;
   wherein the decrypting function uses a user data decryption key for decrypting the user data, wherein the user data decryption key is stored in the user module and does not leave the user module during the procedure of decrypting the user data.

2. Method according to claim 1, wherein the encryption of the user data in storage operations is performed using an encrypting function, which is provided by the user module.

3. Method according to claim 1, wherein
   the encryption of the user data in storage operations is performed using an encrypting function, which is provided by the user module,
   the user module comprises a module memory, in which the encrypting and decrypting functions provided by the user module, as well as key data used by these functions, are contained, and
   the encrypting and decrypting functions are executed, at least in part, by a processor unit of the user module.

4. Method according to claim 3, wherein at least one function for generating the key data and for writing the key data into the module memory is provided by the user module.

5. Method according to claim 1, wherein at least the execution of the decrypting function is protected by at least one of a password and a biometric test.

6. Method according to claim 1, wherein the mobile device is a device that is also set up for telecommunications functions.

7. Method according to claim 1, wherein the mobile device is one of a mobile telephone and a personal digital assistant.

8. Method according to claim 1, wherein the user module is a subscriber identity module that is also provided for logging into a telecommunications network.

9. Method according to claim 1, wherein the mobile device executes at least an application program that is one of an appointment scheduler, an address book management program, a text editor, a spreadsheet program, a database management program, a dictation recording program, a browser, a document viewer, a playback program for multimedia content, and a program that provides an user interface for any one of an appointment scheduler, an address book, a text editor, a spreadsheet program, a database and a dictation recording program.

10. Method according to claim 9, wherein the application program processes the user data.

11. A mobile device comprising:
    a device memory comprising at least one region for storing user data in at least partially encrypted form; and
    an interface for connecting to a user module;
    wherein the mobile device is set up to use a decrypting function at least for decrypting the user data in access operations, the decrypting function being provided by the user module and being executed, at least in part, by a processor unit of the user module, and the decrypting function uses a user data decryption key for decrypting the user data, wherein the user data decryption key is stored in the user module and does not leave the user module during the procedure of decrypting the user data.

12. Mobile device according to claim 11, wherein the mobile device is one of a mobile telephone and a personal digital assistant.

13. Mobile device according to claim 11, wherein the mobile device is set up to execute at least an application program that is one of an appointment scheduler, an address book management program, a text editor, a spreadsheet program, a database management program, a dictation recording program, a browser, a document viewer, a playback program for multimedia content, and a program that provides an user interface for any one of an appointment scheduler, an address book, a text editor, a spreadsheet program, a database and a dictation recording program.

14. Mobile device according to claim 13, wherein the application program is set up to process the user data.

15. Mobile device according to claim 11, wherein the user module is a subscriber identity module for a telecommunications network.

16. User module comprising a processor unit and being set up to be connected to a mobile device via an interface, the mobile device comprising a device memory having at least one region for storing user data in at least partially encrypted form, wherein the user module is set up to provide the mobile device via the interface with a decrypting function at least for decrypting the user data in access operations, the decrypting function being executed, at least in part, by the processor unit of the user module, and
    the decrypting function uses a user data decryption key for decrypting the user data, wherein the user data decryption key is stored in the user module and does not leave the user module during the procedure of decrypting the user data.

17. User module according to claim 16, wherein the user module is a subscriber identity module for a telecommunications network.

* * * * *